March 30, 1926.  1,578,649

F. W. ELY

BENDIX DRIVE TOOL

Filed Sept. 13, 1923  2 Sheets-Sheet 1

Inventor
F. W. Ely
By C. A. Snow & Co.
Attorneys.

March 30, 1926.
F. W. ELY
1,578,649
BENDIX DRIVE TOOL
Filed Sept. 13, 1923    2 Sheets-Sheet 2
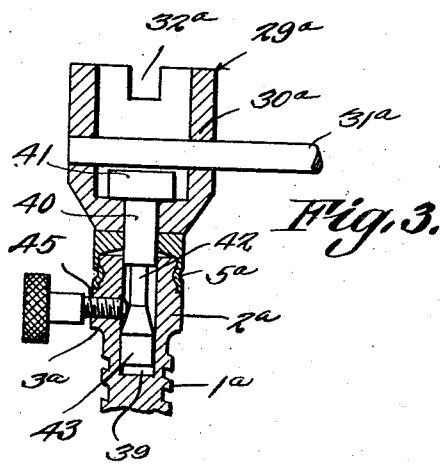
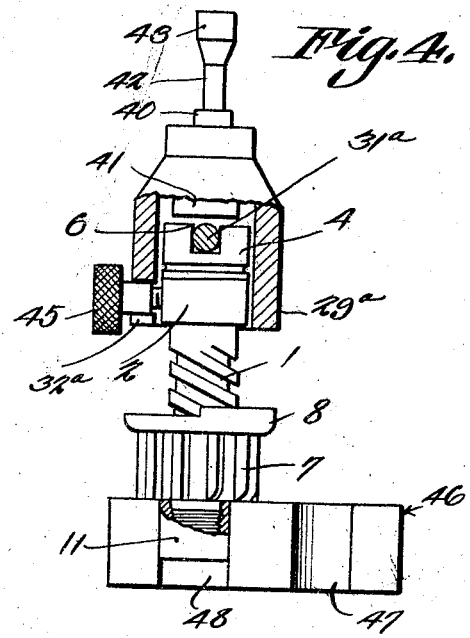
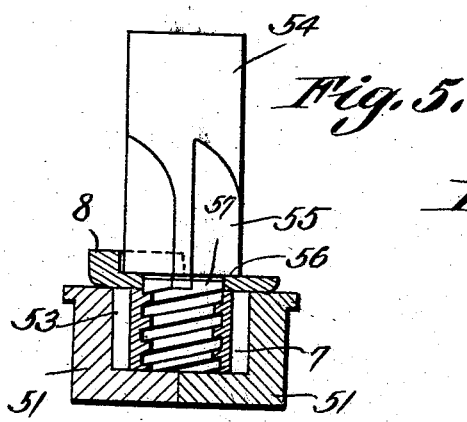
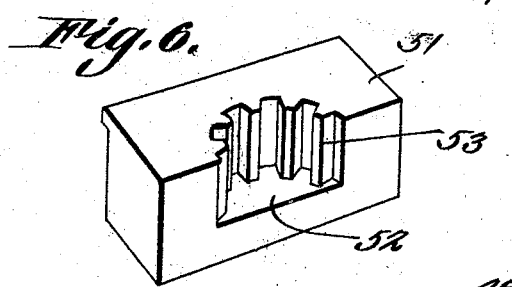
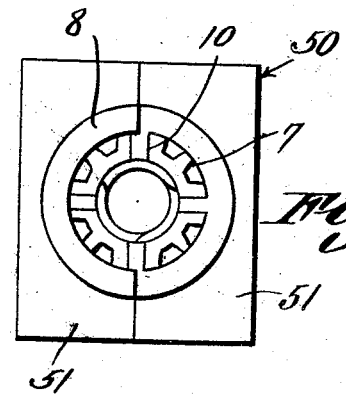
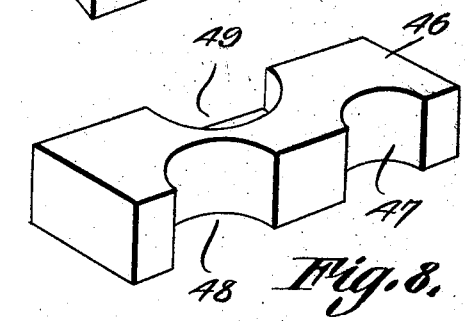

Patented Mar. 30, 1926.

1,578,649

UNITED STATES PATENT OFFICE.

FREDERICK WILLIS ELY, OF ERIE, PENNSYLVANIA.

BENDIX DRIVE TOOL.

Application filed September 13, 1923. Serial No. 662,553.

*To all whom it may concern:*

Be it known that I, FREDERICK WILLIS ELY, a citizen of the United States, residing at Erie, in the county of Erie and State of Pennsylvania, have invented a new and useful Bendix Drive Tool, of which the following is a specification.

The device forming the subject matter of this application is adapted to be used for repairing a well known part of an automobile, said part being known as a Bendix drive. Specifically, the invention aims to provide novel means for creasing the sleeve of the Bendix drive to retain the sleeve on the screw shaft, to provide novel means for removing the nut from the screw shaft, and to provide novel means for seating the counterweight on the pinion which cooperates with the screw shaft.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention may be shown without departing from the spirit of the invention.

Figure 1:
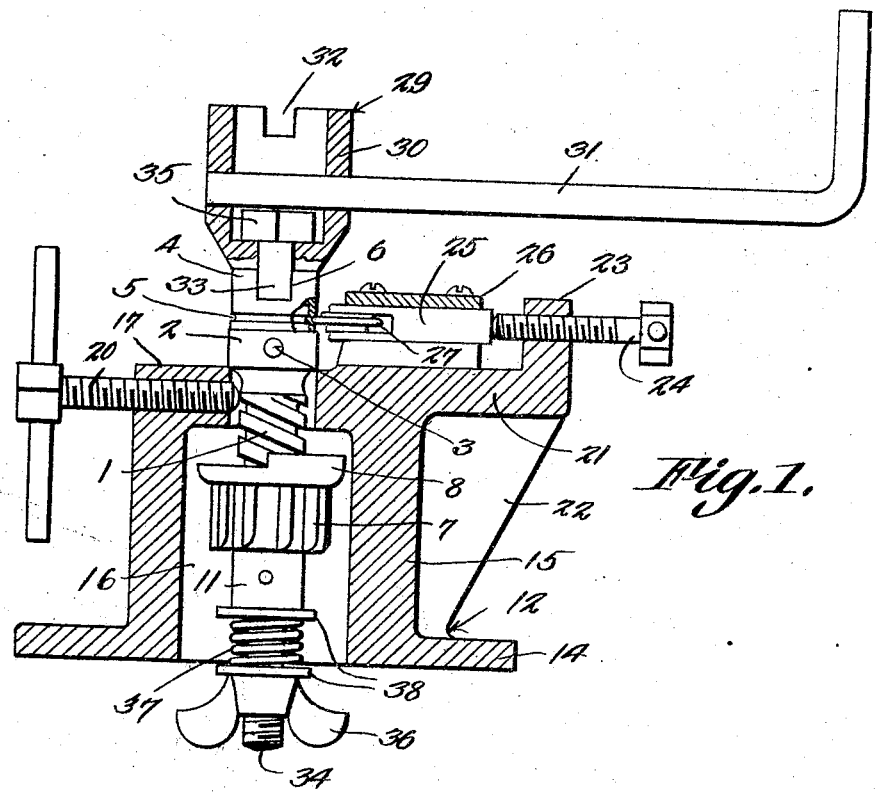
Figure 2:
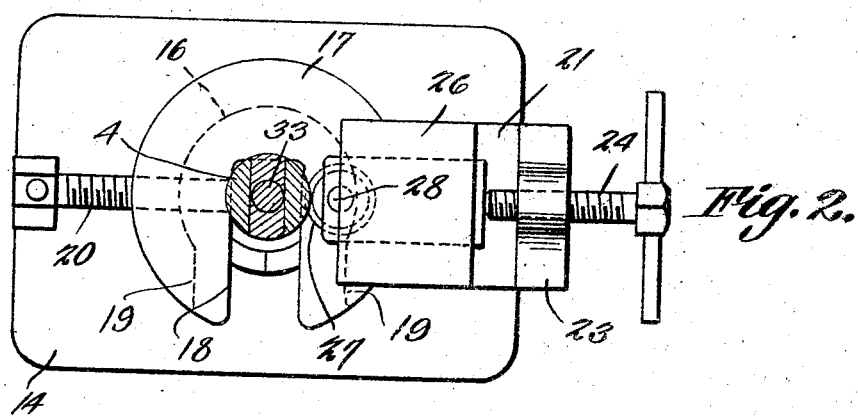

In the accompanying drawings:

Figure 1 shows in section, the machine for creasing the sleeve on the screw shaft of a Bendix drive; Fig. 2 is a top plan wherein a portion of the Bendix drive appears in section; Fig. 3 is a sectional view showing a modified means for rotating the Bendix drive to secure a creasing of the sleeve; Fig. 4 is a sectional elevation showing the means whereby the nut is threaded off the screw shaft of the Bendix drive; Fig. 5 is a sectional view illustrating the means whereby the counterweight is seated on the pinion of the Bendix drive; Fig. 6 is a perspective view showing a portion of the anvil used in Fig. 5; Fig. 7 is a plan showing the pinion and the counterweight in place on the holder; Fig. 8 is a perspective view illustrating one of the grip blocks delineated in Fig. 4.

So far as material to this application, a Bendix drive comprises a screw shaft 1 having a hub 2 provided with an opening 3, the hub being surrounded at one end by a sleeve 4, having a circumferential crease 5 adapted to cooperate with a corresponding circumferential groove in the end portion of the hub 2, there being notches or seats 6 in the outer end of the sleeve 4. A pinion 7 is engaged with the threaded portion of the screw shaft 1. The pinion 7 carries, at one end, a counterweight 8 having lugs adapted to be pressed into seats 10 in the end of the pinion 7. A nut 11 is threaded on one end of the screw shaft 1. Considering first the means for forming the circumferential crease 5 in the sleeve 4, and referring particularly to Figs. 1 and 2 there is provided a frame 12 embodying a base 14 carrying an upstanding hollow pedestal 15 having a recess 16, the pedestal embodying a top 17, an opening 18 extending inwardly from the outer edge of the top 17 as clearly shown in Fig. 2. The pedestal 15 is provided in one side with an opening 19 indicated in dotted line in Fig. 2, and leading to the recess 16, the opening being disposed below the notch or opening 18 in the top 17. A retainer 20, such as a screw, is mounted in the top 17 and is adapted to cooperate with the notch or opening 18 near to the inner end thereof. The pedestal 15 has a lateral arm 21, sustained from the pedestal 15 and the base 14 by a reinforcing fin 22, the arm 21 being equipped at its outer end with an upstanding flange 23 whereinto a feed screw 24 is threaded, the feed screw being adapted to cooperate with a slide 25 mounted for reciprocation in a guide 26 on the top 17 of the pedestal 15 and on the arm 21. A creasing disk 27 is journaled for rotation at 28 on the inner end of the slide 25.

The tool embodies a rotator which is denoted generally by the numeral 29. The rotator 29 includes a hollow head 30. A handle 31 is inserted into the head 30 and may be removable. At its outer end, the head 30 of the rotator is equipped with seats or notches 32, and at its inner end, the head has ribs 33. A stem 34 is mounted in the end of the head 30 and includes an enlargement 35 across which the handle 31 extends, to hold the stem in the head. A nut 36 is threaded on the lower end of the stem 34 and inwardly of the nut 36, the stem is surrounded by a compression spring 37. There may be washers 38 on the stem 34, at the ends of the spring 37.

In practical operation, the Bendix drive is inserted transversely into the pedestal 15, through the openings 18 and 19, the screw shaft 1 being received in the notch or opening 18 and the pinion 7 being received in the recess 16. The screw 20 is advanced to hold the screw shaft 1 against movement, the screw shaft having first been adjusted vertically, so that the proper portion of the sleeve 4 will be disposed opposite to the creasing disk 27. The stem 34 is thrust downwardly through the hollow screw shaft 1, the ribs 33 on the head 30 of the rotator 29 being received in the notches or seats 6 which are formed in the upper end of the sleeve 4. The spring 37 and the washers 38 are mounted on the lower end of the stem 34, and the nut 36 is applied and advanced along the stem to compress the spring 37, thereby holding the ribs 33 of the head 30 of the rotator 20 in the seats 6 of the sleeve 4. Through the instrumentality of the feed screw 24 the slide 25 is advanced, bringing the creasing disk 27 against the periphery of the sleeve 4. By means of the handle 31, the head 30 will be rotated, and rotation will be imparted to the sleeve 4, because the ribs 33 of the head are engaged in the seats 6 of the sleeve. When the sleeve 4 is rotated and when the slide 25 is advanced, the creasing disk 27 will form the crease 5 in the sleeve 4 and connect the sleeve 4 to the hub 2 of the screw shaft 1.

In Fig. 3 of the drawings, parts hereinbefore described have been designated by numerals previously used, with the suffix "a". It may be that the recess 39 extends but part way through the screw shaft 1, longitudinally thereof. Then, obviously, such a part as the long stem 34 of Fig. 1 cannot be used, recourse being had to the short stem 40 having an enlargement 41 engaging the bottom of the head 30ª and located beneath the handle 31ª. The stem 40 has a reduced neck 42 provided with an enlargement 43 received in the recess 39 of the screw shaft 1ª, the enlargement 43 including a conical portion adapted to be engaged by a screw 45 the screw being threaded into the opening 3ª of the hub 2ª of the screw shaft 1ª, the parts 33 and 6 of Fig. 1 operating, as hereinbefore explained, to connect the head with the sleeve, to secure a rotation of the sleeve.

Let it be supposed that it is desired to place the counterweight 8 on the pinion 7. The first step incident to such a proceeding is to remove the pinion 7 from the screw shaft 1 and to do this the nut 11 must be detached from the screw shaft.

In carrying out the operation above mentioned, recourse is had to clamp blocks 46 each clamp block having notches 47 and 48 in one edge, and a notch 49 in its opposite edge, the notches 48, 47 and 49 being of different diameters. It is clear than when two clamp blocks 46 are brought together, the nut 11 may be held in the cooperting notches 48 of the blocks in the cooperating notches 47 or in the cooperating notches 49, depending upon the diameter of the nut 11, the blocks 46 being held together in a vise or in any other suitable device. The rotator, whether provided with the stem 40 of Fig. 3 or the stem 34 of Fig. 1, is inverted from the positions shown in those figures, the handle 31 or 31ª being received in the seats or notch 6 of the sleeve 4 and the neck of the screw 45 being received in the seat 32 or 32ª, the screw 45 being mounted in the opening 3 or 3ª of the screw shaft 1, as hereinbefore explained. Rotation then may be imparted to the head 1 or 1ª and the nut 11, being held by the clamp blocks 46 may be removed. Having removed the nut 11 from the screw shaft 1, the operator threads the pinion 7 off the screw shaft and the operation of placing the counterweight 8 on the pinion may go forward.

The device embodies an anvil 50 made up of blocks 51 provided in their inner edges with recesses 52, the blocks being provided with teeth 53. When two blocks, such as those shown at 51 in Fig. 6, are placed together, the recesses 52 form a circular opening, adapted to receive the pinion 7 as shown in Fig. 5, the teeth of the pinion alternating with the teeth 53 of the blocks. The counterweight 8 is placed on the end of the pinion 7, the lugs on the counterweight being alined with the seats 10 of the pinion 7. Recourse is had to a plunger 54 having radial ribs 55 at one end, the ribs being cut away to form shoulders 56, and to form reduced ends 57 in the ribs 55. The reduced ends 57 of the ribs 55 fit between the inner ends of oppositely disposed lugs on the counterweight 8 and the shoulder 56 engage the upper surfaces of the lugs. The blocks 51 are held in a vise or any other suitable machine, and when the jaws of the vise are brought together, the plunger 54 will be advanced, the lugs on the counterweight 8 being crowded into the seats 10 on the pinion 7.

The device as described embodies a simple means whereby many of the necessary repairs in a Bendix drive may be accomplished.

What is claimed is:

In a device of the class described, a frame including a pedestal having a top, there being a recess in the pedestal, and a reduced opening in the top, the opening extending through the edge of the top and the pedestal having a side opening communicating with the opening in the top, a retainer mounted in the top and extending into the opening in the top, a slide mounted for reciprocation on the top, means for advancing the slide, and a creaser carried by the slide and adapted to cooperate with an article which has been inserted into the opening in the top of the pedestal by way of the side opening.

In testimony that I claim the foregoing as my own, I have hereto affixed my signature.

FREDERICK WILLIS ELY.